Aug. 17, 1937. A. M. KREMENTZ ET AL 2,090,298
OPHTHALMIC DEVICE
Filed Aug. 12, 1936
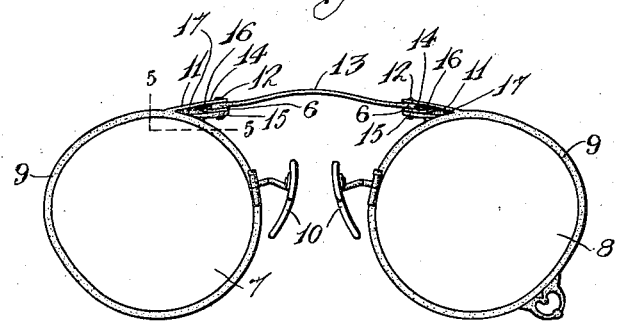
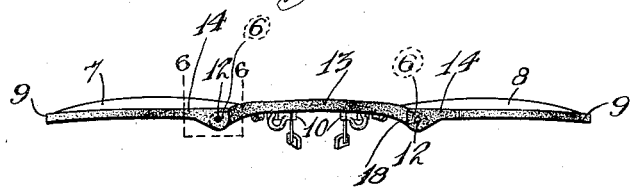
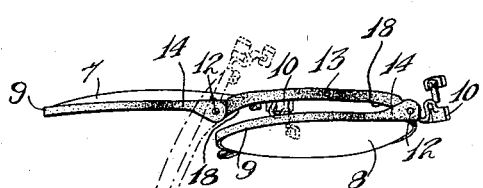
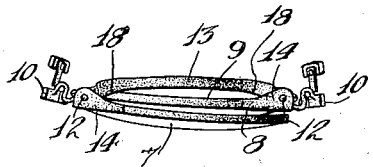
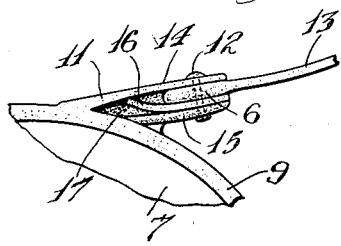
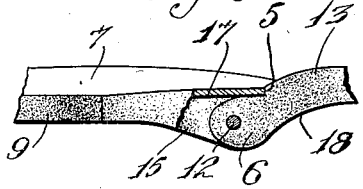
INVENTORS.
Albert M. Krementz
BY James L. Donnelly
Frank C. Fischer
ATTORNEY Patented Aug. 17, 1937

2,090,298

UNITED STATES PATENT OFFICE 2,090,298

OPHTHALMIC DEVICE

Albert M. Krementz, Maplewood Township, Essex County, and James L. Donaly, Bloomfield, N. J., assignors to Frank Krementz Co., Newark, N. J., a corporation of New Jersey Application August 12, 1936, Serial No. 95,552

5 Claims. (Cl. 88—44)

This invention relates to improvements in eyeglasses of the oxford type, and more particularly to means to enable such eyeglasses to be folded so as to occupy a relatively small space when not in use.

Heretofore, folding eyeglasses of the oxford type have employed a spring bridge against the tension of which the glasses were folded in parallel planes so that they would coincide with each other and be held in such a position by means of a latch. This form of eyeglasses was found objectionable in that when the latch is released, the glasses spring apart with a decided snapping motion, having a tendency, after a certain amount of use, to distort the spring bridge and place the eyeglasses out of correct alignment. Also, in the folding eyeglasses employing a spring bridge, unless care is used, there is a likelihood of scratching the lens. Inasmuch as eyeglasses of the oxford type are generally employed for occasional use, that is, for reading purposes from time to time or the close inspection of objects, there obviously will be a number of foldings of the eyeglasses each day; and with each folding the above objections are apparent.

It is an object of this invention to provide eyeglasses of the oxford type with means to enable them to be folded without resort to distortion of a spring bridge, and without the likelihood of the lens being scratched or otherwise marred during folding operation.

A further object is the provision of eyeglasses of the oxford type having means to enable them to be folded in juxtaposition by folding motion substantially the same as the opening or closing of a door or other hingedly connected members; and which requires no latching means to hold the eyeglasses in the folded condition.

These and other advantageous objects, which will later appear, are accomplished by the simple and practical construction and arrangement of parts hereinafter described and exhibited in the accompanying drawing, forming part hereof, and in which:

Fig. 1 is an elevational view of folding eyeglasses embodying our invention, the eyeglasses being in the extended position ready for use, Fig. 2 is a top view of the eyeglasses shown in Fig. 1, Fig. 3 is a top view of the glasses partially folded, Fig. 4 is a top view of the glasses completely folded, Fig. 5 is a view taken on line 5—5 of Fig. 1, and Fig. 6 is a view taken on line 6—6 of Fig. 2.

Referring to the drawing, the eyeglasses are shown to include a pair of lenses 7 and 8, encircled by frames 9 provided with nose pieces 10. At the upper end of the frames 9 there are provided hinged butts 11 to which are secured, by means of pivot pins 12, the offset ends 6 of a bridge member 13. Each of the hinge butts comprises a pair of spaced apart portions 14 and 15 between which the ends of the bridge member 13 are positioned, and interposed between said portions 14 and 15 and engaging the ends of the bridge member 13 are leaf springs 16 which constantly maintain the bridge member 13 in frictional engagement with portions 14.

In operation, when it is desired to fold the eyeglasses, referring to Fig. 3, it is seen that the eyeglass 8 is folded forwardly so that it is substantially parallel to the bridge member 13. The eyeglass 7 is then folded forwardly in a similar manner over the eyeglass 8 so that the eyeglasses 7 and 8 and the bridge member 13 are substantially parallel, and the eyeglasses are in the folded position as shown in Fig. 4. It will be seen that no latches are required to maintain the glasses in the folded position as the frictional engagement of the ends of the bridge member 13 with the portions 14 of the butts 11 is sufficient to prevent accidental opening of the eyeglasses.

Each of the butts 11 is provided with a side wall 17 which prevents folding of the glasses in an opposite direction by engaging shoulder 5 of the bridge member 13 as is apparent from Fig. 6. In this manner improper folding of the glasses is prevented.

From the above description it will be seen that we have provided eyeglasses of the oxford type which have simple and relatively inexpensive means enabling them to be folded without resort to distortion of the usual spring bridge, and which requires no latches or similar means to maintain the eyeglasses in a folded position. It is obvious that the glasses will not open with a snap, and consequently there will be no resulting distorting of the bridge members tending to throw the lenses out of alignment.

It will be noted that the bridge member 13, adjacent the hinge connections has portions 18, slightly curved, and the bridge member has a length slightly greater than each eyeglass, so that when the eyeglasses are in the folded condition, eyeglass 8 will nest within the bridge member and be substantially parallel thereto as shown in Fig. 4.

The foregoing disclosure is to be regarded as descriptive and illustrative only, and not as restrictive or limitative of the invention, of which obviously many embodiments may be constructed, including many modifications, without departing from the spirit of the invention as set forth and denoted in the appended claims.

Having thus described our invention, what we claim as new and desire to secure by Letters Patent, is:

1. In eyeglasses of the oxford type, a first eyeglass and a second eyeglass, hinge butts mounted on the upper edges of said eyeglasses, said hinge butts having spaced apart portions, a bridge member having its ends positioned between said spaced apart portions, and pivots lying substantially in the plane of the eyeglasses when extended for connecting the bridge member to said hinge butts, said first eyeglass being foldable clockwise parallel to the bridge member, said second eyeglass being foldable counter-clockwise in juxtaposition to and over said first eyeglass and on the same side of the bridge member, means to prevent said first eyeglass from being folded counter-clockwise, and means to prevent said second eyeglass from being folded clockwise.

2. In eyeglasses of the oxford type, a first eyeglass and a second eyeglass, hinge butts mounted on the upper ends of said eyeglasses, a bridge member, and pivots lying substantially in the plane of the eyeglasses when extended for connecting the bridge member to said hinge butts, said first eyeglass being foldable clockwise parallel to the bridge member, said second eyeglass being foldable counter-clockwise in juxtaposition to and over said first eyeglass and on the same side of the bridge member, means to prevent said first eyeglass from being folded counter-clockwise, and means to prevent said second eyeglass from being folded clockwise.

3. In eyeglasses of the oxford type, a first eyeglass and a second eyeglass, hinge butts mounted on the upper edges of said eyeglasses, said hinge butts having spaced apart portions, a bridge member having its ends positioned between said spaced apart portions, and pivots lying substantially in the plane of the eyeglasses when extended for connecting the bridge member to said hinge butts, said first eyeglass being foldable clockwise parallel to the bridge member, said second eyeglass being foldable counter-clockwise in juxtaposition to and over said first eyeglass and on the same side of the bridge member, means to prevent said first eyeglass from being folded counter-clockwise, means to prevent said second eyeglass from being folded clockwise, and resilient means supported by said hinge butts to maintain the ends of the bridge member in frictional engagement with said spaced portions.

4. In eyeglasses of the oxford type, a first eyeglass and a second eyeglass, hinge butts having spaced apart portions and side walls mounted on the upper edges of said eyeglasses, a bridge member having its ends positioned between said spaced apart portions, and pivots lying substantially in the planes of the eyeglasses for connecting the bridge member to said hinge butts, said first eyeglass being foldable clockwise parallel to the bridge member, said second eyeglass being foldable counter-clockwise in juxtaposition to and over said first eyeglass and on the same side of the bridge member, said side walls of the hinge butts engaging the ends of the bridge member to prevent the first eyeglass from being folded counter-clockwise and to prevent the second eyeglass from being folded clockwise.

5. In eyeglasses of the oxford type, a first eyeglass and a second eyeglass, hinge butts having spaced apart portions and side walls mounted on the upper edges of said eyeglasses, a bridge member having its ends positioned between said spaced apart portions, and pivots lying substantially in the planes of the eyeglasses for connecting the bridge member to said hinge butts, said first eyeglass being foldable clockwise parallel to the bridge member, said second eyeglass being foldable counter-clockwise in juxtaposition to and over said first eyeglass and on the same side of the bridge member, said side walls of the hinge butts engaging the ends of the bridge member to prevent the first eyeglass from being folded counter-clockwise and to prevent the second eyeglass from being folded clockwise, and means supported by the hinge butts to maintain the ends of the bridge member in frictional engagement with said spaced portions.

ALBERT M. KREMENTZ.
JAMES L. DONALY.